March 21, 1967     J. T. WIMER     3,309,811
FISH LURE
Filed Oct. 16, 1964     2 Sheets-Sheet 1
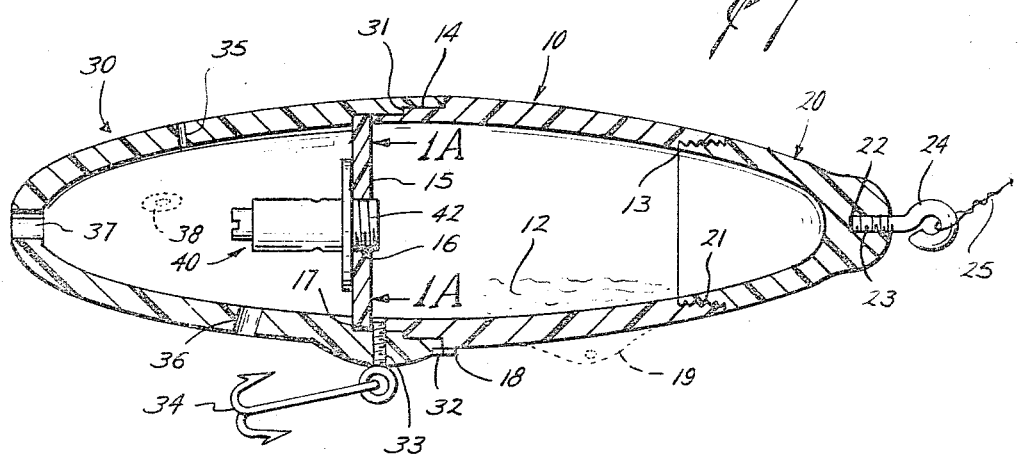
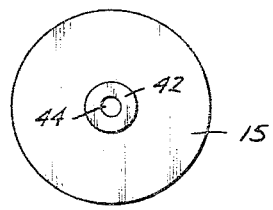
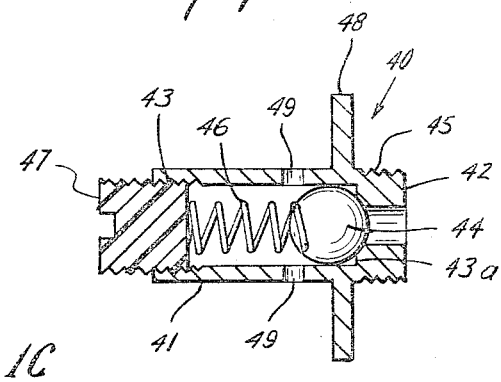
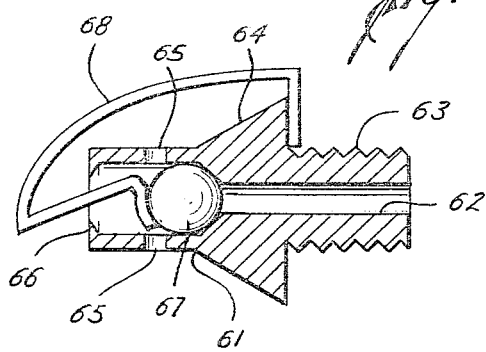
James T. Wimer
INVENTOR.
BY Robert W B Dickerson
ATTORNEY March 21, 1967 J. T. WIMER 3,309,811
FISH LURE
Filed Oct. 16, 1964 2 Sheets-Sheet 2
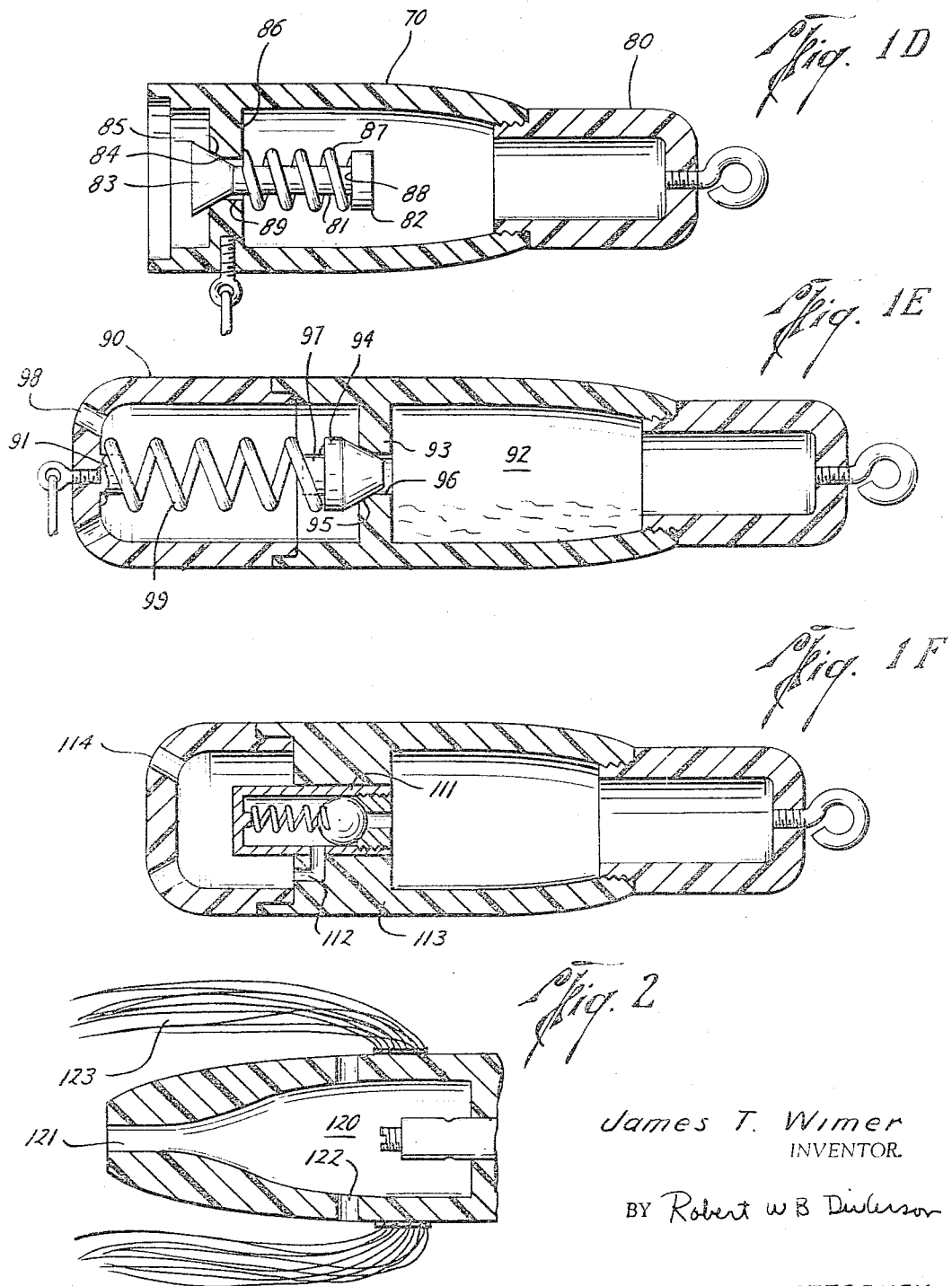
James T. Wimer
INVENTOR.
BY Robert W B Dickerson
ATTORNEY

United States Patent Office 3,309,811
Patented Mar. 21, 1967

3,309,811
FISH LURE
James T. Wimer, 2400 W. Briton Road,
Oklahoma City, Okla. 73120
Filed Oct. 16, 1964, Ser. No. 404,233
10 Claims. (Cl. 43—42.06)

This invention pertains to an improved fishing lure or plug, and more particularly to one that more closely simulates the action of natural bait to which fish are normally attracted and on which they feed.

For as long as man has taken hook and tackle to the waterways, he has attempted to entice fish onto a readily provided hook. While oftentimes live bait is most attractive, the difficulties of having a readily available supply of same are obvious. Further, artificial bait that merely simulates the action of live bait has oftentimes proved even more attractive. Most presently used lures rely on their being reeled in to produce their motion in the water. Some attempts have been made to produce bubbles at the lure, thereby simulating the presence of live bait. These latter type devices utilize a substance which, when contacted by water, will cause a gas to form, thereby producing bubbles under water. This type device is typified in U.S. Patents Nos. 2,423,717, 2,594,387, 2,497,846, 2,968,886, 3,105,317, 2,256,813, 2,910,800, 2,805,511, and 2,599,128.

This invention contemplates a gas-caused buildup in pressure within a cavity portion of a fishing lure. By means of a valve, gas is emitted, in spurts or jets, from the cavity portion into the surrounding water. This causes definite movements of the plug as well as creates bubbles suggestive of a live attraction and fairly titillates the palate of any near-by fish. Therefore, an object of this invention is the provision of a new and novel fishing lure.

A further object is the provision of a lure having gas creating means therein and valve means for controlling gas emission from said lure.

Still a further object is the accomplishing of an artificial plug capable of easy assembly and disassembly and having a unique method of permitting a hook-associated portion serving as a means of linking diverse sections of the assembly.

These and further objects will become obvious on considering the following description, claims and drawings, in which:

FIGURE 1 is a vertical section showing one embodiment of this invention;

FIGURE 1A is a rear view taken along lines 1A—1A of FIGURE 1 showing the valve assembly thereof from the rear;

FIGURE 1B is an enlarged sectional view of the valve assembly of FIGURE 1;

FIGURE 1C is a vertical section of a modified valve assembly;

FIGURE 1D is a sectionalized view depicting another valve assembly utilized in another plug;

FIGURES 1E and 1F are still further vertical sections depicting modified valve assemblies and plugs containing same;

FIGURE 2 is a modified head portion shown in vertical section.

Consider first the embodiment of FIGURES 1, 1A and 1B. The lure or plug is seen to have a central hollow portion 10 designed to contain a quantity of a gas producing substance 12. The rear of body member 10 is interiorly threaded, as at 13, to allow mating with the exteriorly threaded portion 21 of crescent-shaped hollow end or tail member 20. The extreme rear of tail portion 20 may be thickened at 22 and having a threaded drill or bore as at 23, for receiving a threaded eye 24. The fishing line 25 may be secured to eye 24. The diameter of central body member 10 is reduced at 14 to permit telescopic insertion into head portion 30, the extreme forward end of the central member 10 coming to rest against and be limited by shoulders 31 formed on the interior surface of hollow head 30. Said forward end of body member 10 is closed, as at 15, save for central aperture 16. Through this aperture fits a portion of valve assembly 40. In the portion of body member 10 that is insertable within head 30, this portion being designated 14, a threaded bore 17 extends therethrough. Aligned with said bore and adjacent thereto, there are indicator means 18. Companion indicator means 32 are present on the adjacent portion of head 30, said head portion having an interiorly threaded bore 33, designed to form an extension of bore 17 when said indicia or indicator means 18 are aligned with similar means 32. These indicator means may take the form of upstanding ridges, beads or alignable lines painted on the exterior surface of both body member 10 and head 30. When bores 17 and 33 are aligned, threaded hook assembly 34 (may take the form of an eyelet to which a hook or line may be attached) may be screwed through the thickness of head 30 and well into or through the adjacent portion of body 10. This not only provides an appropriate hook assembly, but also secures the telescoping pieces 10 and 30. Further different eye or hook attaching portions are shown in phantom lines at 19. It should be understood that placing of the hook attachments affects the balance of the lure and therefore the particular movement performed thereby. Thus, hooks may be provided at separate and diverse portions, depending on the type action desired, i.e., dipping, fluttering, rising or spasmodic.

Head portion 30 is provided with air escape holes 35, 36, through its outer walls, and is open at 37, the latter opening simulating an open mouth. Exterior decoration, such as eye 38, is usually provided.

Consider now the valve mechanism shown especially in FIG. 1B. The valve consists of a piston or more appropriately a ball bearing 41. Said ball bearing is generally cylindrical in configuration, being open at ends 42 and 43. The inner diameter is reduced at 43a, near end 42, providing a limiting position for ball 44. The inner surface may be chamfered to provide a smooth surface blend passing from the extended diameter portion to that of reduced diameter, and to provide a snug nest for ball 44. The exterior surface of bearing 41 is threaded, as at 45, to allow screwing into aperture 16 in partition 15 of the body portion 10, interior threads being provided within aperture 16. Of course valve assembly 40 may be press fitted within aperture 16, but mating threads are preferred. Pressing against ball 44, is a light coil spring 46, which in turn is coerced by exteriorly threaded plug 47, whose threads will mate with corresponding interior threads provided the inner surface of bearing 41 adjacent end 43. In approximately the transitional area of interior thickness, bearing 41 possesses an exterior circular flange 48 which acts as a stop member and as a seal, effectively blocking any fluid passage from the central body cavity other than through the valve mechanism. Drills or bores defining gas escape holes 49 communicate between the interior of bearing 41 and the exterior thereof.

In operation, a certain amount of propellant is provided to central body member 10. This propellant may be chosen from a number of known mixtures that emit gas when contacted by water. The preferred mixture contains citric acid powder, baking soda, bicarbonate of soda and ordinary kitchen flour, the latter added to slow the reaction. A small quantity of water is then cupped into tail portion 20, and it is screwed onto body member 10. Prior to the above described operation, body member 10 may be telescopically inserted into head portion 30, keeping in mind the necessity for aligning detents or indicator members 18 and 32. On openings 17 and 33 being aligned, hook 34, or an eye may be engaged therewith, uniting these elements. On completion of the assembly, the lure is ready to be cast or placed into a body of water. As interior water, from tail portion 20, contacts propellant 12, gas is emitted thereby. As pressure builds up within the central cavity of members 10 and 20, pressure is exerted against ball 44 and spring 46 pressing thereagainst. One the pressure rising above a certain level, the ball is forced a sufficient distance to the left in FIGURES 1 and 1B, to allow the pent-up gas to escape through relief holes 49, then through head holes 35 and 36. On the pressure being relieved, spring 46 will return ball 44 to its starting position to begin the cycle again. Thus, the jet action propelling the lure will occur in spurts, creating a most desirable effect from the point of view of an angler seeking a trophy or sustenance. It is noted that the particular motion of the lure will be the product of variables. For example, the propellant mixture may be varied so as to cause rapid or slow reaction. The positioning of the propellant within body member 10 will affect the weight distribution, and thereby, the normal movement. Further the portion of tail member 20 that links with body member 10 may be so formed that water is "dished" within portion 20, and will only flow into member 10 on the head portion being tilted downwardly, any gas-caused motion tending to lift the head portion upwardly. This could be caused by varying the weight distribution. The resultant overall motion would be of a "popping" type.

Numerous other valve type assemblies are possible utilizing the principles of this invention. For example, see FIGURE 1C. This embodiment also includes a ball bearing designated 61, said bearing having an inner surface 62, of reduced diameter, and an externally threaded portion 63, permitting engagement with opening 16 in the partition or end wall of body member 10. There further is a fin shaped flange 64 extension of bearing 61 permitting sealing engagement in substantially the same manner as flange 48 of FIGURE 1B. Leaf spring 68 is preferably fitted into a recess (not shown) in the end wall of body member 10 so as not to prevent the sealing engagement of fin shaped flange 64. However, if such recess is not provided, the externally threaded portion 63 will sufficiently seal the opening 16 in the end wall of body member 10. While in FIGURE 1B, threaded plug 47 permits adjustment of the pressure upon ball 44 by adjusting the compression exerted against coil spring 46, in the embodiment of FIGURE 1C, this pressure is regulated by the selection of leaf spring 68. Ears 66 serve as an ultimate limit to movement of ball 67. There are gas escape holes 65 to the left, in FIGURE 1C, functioning in the same manner earlier described. Operation of this type valve assembly is felt to be obvious.

In the embodiment of FIGURE 1D, a propellant would be placed within the internal cavity of body member 70, and water originally inserted within threadedly engageable head portion 80. On gas pressure building up within the cavity defined thereby, pressure would be exerted against the valve assembly of this embodiment. This assembly comprising an extended rod portion 81, a rectangular or circular flange 82 at one end thereof, a wing shaped, in cross section, flange 83 at the other end of rod 81, said latter flange having beveled portions 84 permitting sealing engagement with beveled sides 85 of centrally apertured partition 86 formed as an extension of the inner wall of body member 70. A coil spring 87 is wound around rod 81 and presses against the shoulder 88 and against a wall of partition 86, thereby tending to keep aperture 89 of partition 86 closed by virture of flange 83 pressing thereagainst. On pressure building up, pressure will cause flange 82 to compress coil spring 87, remove flange 83 from aperture 89, thereby providing gas escape passages.

In FIGURE 1E there is an embodiment similar to that of FIGURE 1D. Here the valve device lies outside the central propellant containing cavity. The valve includes base lug 91 affixed to one end of head portion 90. A partition 93 similar to member 86 of FIGURE 1D separates central propellant containing cavity 92 from head portion 90. A plug 94 having beveled surfaces 95 is caused to seal aperture 96 in partition 93 by virtue of coil spring 99 which is attached to a base portion 97 of plug 94 and to lug 91 and is in compression therebetween. As gas pressure builds up within cavity 92, plug 94 is caused to retreat from aperture 96, permitting gas to jet out through gas evacuation holes 98.

In the embodiment of FIGURE 1F, the valve assembly is similar to that of FIGURE 1B, except that the valve assembly is press fitted into aperture 111 rather than screwed into. The gas escapes through drill or bore 112 in partition 113, thence jets out gas escape holes 114.

FIGURE 2 depicts a different head assembly creating a unique effect. This assembly is designed to telescope over the body member, much as do similar parts in FIGURE 1. The large central cavity 120 narrows to a rather restricted mouth portion at 121, the gas escape holes being at 122. Strands 123 present a skirt like appearance, and are adhesively or otherwise affixed to the head assembly. On the pulsating gas escaping, the lure will jerk, causing the skirt portion to spread and then return, presenting the appearance of a squid.

While several embodiments of the same invention have been presented, it should be obvious that numerous others are possible, the only limitation thereon being the following appended claims in which I claim:

1. An artificial fish lure including:
   a hollow head portion of rigid construction having a gas escape hole through a portion of a wall thereof,
   a hollow body portion connected to said head portion and containing a portion of a gas producing substance, and partition means separating said head and body portions,
   conduit means through said partition means and connecting the hollow interiors of said head and said body,
   valve means at least partially disposed within said conduit means, said valve means including a valve, a spring mechanism urging said valve to closed position, a gas exit portion controlled by said valve and means causing said spring to be compressed, thus causing said exit portion to be unblocked on gas pressure within said body portion exceeding a certain level.

2. An artificial fish lure comprising:
   a first hemispherical portion forming a hollow head portion,
   a second portion, being hollow, telescopically insertable within said first portion,
   a first aperture through one wall of said first portion and first indicator means on said first portion's outer surface adjacent said first aperture and directing attention thereto,
   a second aperture through one wall of said second portion and second indicator means on said second portion's outer surface directing attention to said second aperture, said second aperture being so positioned that when said second portion is fully inserted within said first portion and said first and second indicator means are aligned, said first and second apertures will form a continuous passage,
   locking means insertable through all of said first aperture and at least a portion of said second aperture,
   a perforated wall connecting the interiors of said first and second portions,
   means for producing gas pressure in said second portion, valve means partially insertable into said perforated wall, said valve means including a bearing portion and a ball partially encompassed thereby, said valve means further including spring means compressed by said ball on gas pressure in said second portion increasing beyond a certain level, said bearing portion being adapted to receive a regulatable plug portion, a plug portion regulatably insertable in one end of said bearing and engageable with said spring means thereby varying the gas pressure necessary to compress said spring beyond a certain position on said bearing portion.

3. The combination of claim 2 whereby:

said bearing portion includes gas escape means at said certain position on said bearing portion, said escape means forming a further aperture.

4. The combination of claim 3 wherein:

said perforated wall includes a conduit communicating with said further aperture.

5. An artificial fish lure including the combination of:

a hemispherically shaped rigid hollow head portion, a hollow body portion having a substantially centrally apertured end wall, said body portion adapted to contain a gas producing substance, valve means blocking the exit of gas produced within said body portion through said aperture in said end wall, said valve means including a spring biased plug portion biased so as to normally seal said aperture, and said head portion secured to said body portion to cover said apertured end wall and forming a chamber outwardly of said hollow body portion, said head portion having an exit opening.

6. The combination of claim 5 wherein:

said spring being connected at its end opposite said plug to a lug on the wall of said head portion.

7. An artificial fish lure including:

a hollow head portion, a hollow body portion connected to said head portion and containing a portion of a gas producing substance, conduit means interconnecting the hollow interiors of said head and said body, valve means at least partially disposed within said conduit means, said valve means including a valve, a spring mechanism urging said valve to closed position, a gas exit portion controlled by said valve and means causing said spring to be compressed, thus causing said exit portion to be unblocked on gas pressure within said body portion exceeding a certain level, and a movable skirt portion affixed to said head portion, gas escape means located adjacent to the affixation of said movable skirt portion.

8. An artificial fish lure comprising:

a first hemispherical portion forming a hollow head portion, a second portion, being hollow, telescopically insertable within said first portion, a first aperture through one wall of said first portion and first indicator means on said first portion's outer surface adjacent said first aperture and directing attention thereto, a second aperture through one wall of said second portion and second indicator means on said second portion's outer surface directing attention to said second aperture, said second aperture being so positioned that when said second portion is fully inserted within said first portion and said first and second indicator means are aligned, said first and second apertures will form a continuous passage, locking means insertable through all of said first aperture and at least a portion of said second aperture, means for producing gas pressure in said second portion, a movable skirt portion affixed to said first portion, and gas escape means in said first portion located adjacent to the affixation of said movable skirt portion.

9. An artificial fish lure comprising:

a first hemispherical portion forming a hollow head portion, a second portion, being hollow, telescopically insertable within said first portion, means for producing gas pressure in said second portion, gas escape means in said first portion, a perforated wall connecting the interiors of said first and second portions, valve means partially insertable into said perforated wall, said valve means including a bearing portion and a ball partially encompassed thereby, said valve means further including spring means compressed by said ball on gas pressure in said second portion increasing beyond a certain level, a first aperture through one wall of said first portion and first indicator means on said first portion's outer surface adjacent said first aperture and directing attention thereto, a second aperture through one wall of said second portion and second indicator means on said second portion's outer surface directing attention to said second aperture, said second aperture being so positioned that when said second portion is fully inserted within said first portion and said first and second indicator means are aligned, said first and second apertures will form a contiguous passage, and locking means insertable through all of said first aperture and at least a portion of said second aperture.

10. An artificial fish lure including:

a hollow head portion of rigid construction having a gas escape hole through one end thereof, a hollow body portion connected to said head portion and containing a portion of a gas producing substance, and partition means separating said head and body portions, conduit means through said partition means and connecting the hollow interiors of said head and said body, valve means at least partially disposed within said conduit means, said valve means including a valve, a spring mechanism urging said valve to closed position, a gas exit portion controlled by said valve and means causing said spring to be compressed, thus causing said exit portion to be unblocked on gas pressure within said body portion exceeding a certain level.

References Cited by the Examiner

UNITED STATES PATENTS

| | | | |
|---|---|---|---|
| 777,306 | 12/1904 | Rawlinson | 285—93 |
| 1,273,174 | 7/1918 | Noakes | 285—93 |
| 2,256,813 | 9/1941 | Mikina | 43—42.06 |
| 2,320,145 | 5/1943 | LaDue. | |
| 2,415,742 | 2/1947 | Hiltabidel et al. | 43—42.06 |
| 2,599,128 | 6/1952 | Roberts | 43—42.06 X |
| 2,640,292 | 6/1953 | Nadolny | 43—43.35 X |
| 2,716,830 | 9/1955 | Burden | 43—42.06 |
| 2,854,776 | 10/1958 | Van Sant | 43—26.2 |
| 3,012,356 | 12/1961 | Tyson | 43—42.28 X |

SAMUEL KOREN, *Primary Examiner.*

D. J. LEACH, *Assistant Examiner.*